F. S. HURST.
BEAM COMPASS.
APPLICATION FILED MAY 4, 1906.
939,597.
Patented Nov. 9, 1909.
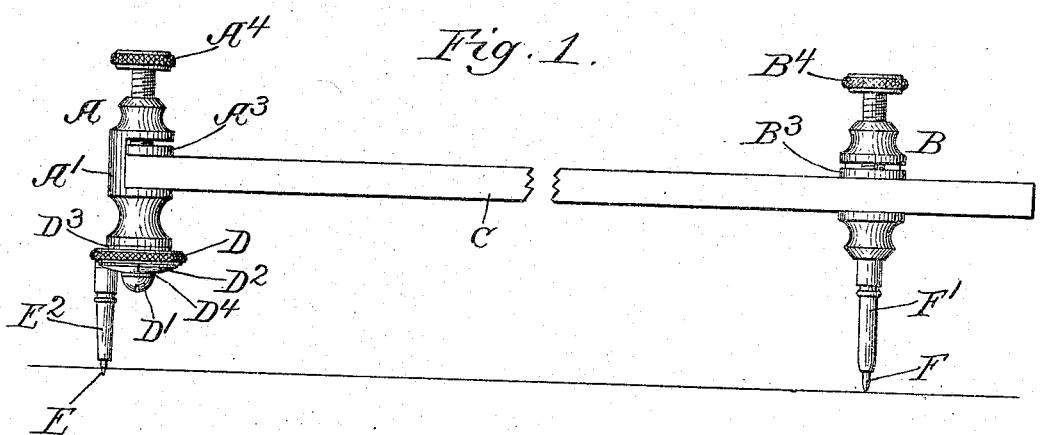
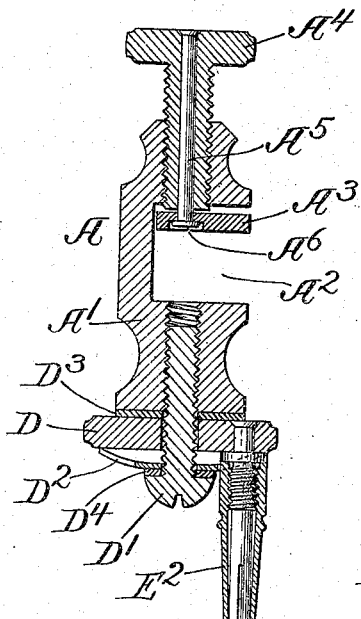
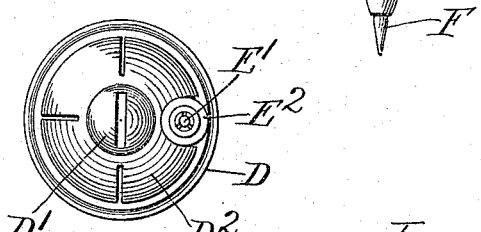
Witnesses.
Edward T. Wray.
Edna K. Reynolds.
Inventor.
Frank S. Hurst
by Parker & Carter
Attorneys.

UNITED STATES PATENT OFFICE.

FRANK S. HURST, OF LOS ANGELES, CALIFORNIA.

BEAM-COMPASS.

939,597.  Specification of Letters Patent.  Patented Nov. 9, 1909.

Application filed May 4, 1906. Serial No. 315,148.

*To all whom it may concern:*

Be it known that I, FRANK S. HURST, a citizen of the United States, residing at Los Angeles, in the county of Los Angeles and State of California, have invented a certain new and useful Improvement in Beam-Compasses, of which the following is a specification.

My invention relates to beam compasses, and has for its object to provide new and improved compasses of this description.

My invention is illustrated in the accompanying drawings, wherein—

Figure 1 is a view of one form of compasses showing the parts in position; Fig. 2 is a sectional view through the centering part of the compasses; Fig. 3 is a view of the centering part of the compasses as seen from beneath. Fig. 4 is an enlarged view of the movable or circle generating part.

Like letters refer to like parts throughout the several figures.

One of the difficulties connected with beam compasses is the difficulty of securing a proper adjustment between the centering part and the moving or circle generating part.

My invention has among other objects to provide beam compasses wherein the parts are small, light and strong, and can be easily and quickly attached to any ordinary beam, and when attached the centering part and the moving part can be accurately and quickly adjusted with relation to each other so as to vary the diameter of the circle.

Referring now to Fig. 1 of the drawings, I have shown the parts assembled. In this figure the centering part A and the moving or circle generating part B are connected to the beam C. The centering part and the circle generating part may be attached to the beam at any desired point, and may be adjusted therealong. I prefer, however, to have the centering part connected to the end of the beam, as shown in Fig. 1. The centering part A consists of the body portion $A^1$ provided with a slot or opening $A^2$ to receive the beam C. Associated with the centering part is a clamping piece $A^3$ which is connected to a thumb screw $A^4$. This clamping piece is preferably rotatably connected with the screw. As herein shown a pin $A^5$ passes through the clamping piece and is provided with a head $A^6$ which fits into a recess in the clamping piece. The pin $A^5$ as shown projects into the screw and may be soldered or otherwise fastened therein. When the screw rotates the pin rotates with it, and the clamping piece is moved up or down so as to clamp the beam. Connected with the body portion $A^1$ is a rotating disk D. This disk is attached to the body portion $A^1$ in any suitable manner. As herein shown this disk is held in place by a screw $D^1$. This screw has a tight thread fit in the body portion $A^1$ so as to remain in any set position. Some means is provided for frictionally holding the disk D, the parts arranged, however, so that the disk can be rotated but will stay in any given position. As herein shown this is secured by providing a spring washer $D^2$ which is interposed between the head of the screw $D^1$ and the disk D. The tightening of the screw causes pressure to be exerted on the disk through the washer. I prefer to provide the disk with friction reducing washers $D^3$, $D^4$ between the frictional surfaces. These friction reducing washers may be made of any suitable material such as celluloid, paper, mica or the like. The centering pin E is eccentrically mounted upon the disk D in any desired manner. As herein shown this centering pin is held in an adjustable clamping piece $E^1$ fastened to the disk and surrounded by the adjustable sleeve $E^2$, the holder being clamped by rotating this sleeve. It will thus be seen that the disk D may be rotated by the thumb and finger so as to vary the position of the centering point. The movable or circle generating part B is provided with the body portion $B^1$, with the opening or slot $B^2$, the clamping piece being held in position by the pin $B^5$.

The marking point F is fastened to the body portion $B^1$ in any desired manner. As herein shown it is associated with a holding piece $F^1$ which projects up into the body portion $B^1$ and is clamped by the screw $F^2$. It is of course evident that a pen or pencil, or any other desired marking device may be placed in the body portion $B^1$. This body portion is clamped to the beam C by tightening the screw $B^4$. In the use of the device the parts A and B are clamped in the desired position on the beam C. The centering point E is then inserted in place and the proper adjustment is secured by rotating the disk D. In view of the fact that the centering point is eccentrically mounted upon the disk D a rotation of this disk will change the distance between this centering point and the marking point, and hence change the diameter of the circle. It will further be seen that the adjusting device is under perfect control, and that a small or large adjustment may be secured. In fact this device permits of a micrometer adjustment. After adjustment in any desired position, the parts remain in this position, and the compasses may be operated by moving the circle generating device B in the manner desired.

I have described in detail a particular construction embodying my invention, but it is of course evident that the parts may be varied in form, construction and arrangement without departing from the spirit of my invention. I therefore do not limit myself to the particular construction shown.

I claim:

1. Beam compasses comprising a centering part and a moving part, a beam to which said parts are clamped, a disk connected with said centering part, a holding piece passing loosely through said disk, a centering point substantially parallel to said holding piece eccentrically mounted upon said disk, and means for connecting said holding piece and said disk so as to hold said disk in any desired position.

2. Compasses comprising a point adapted to engage the surface on which the compasses are used, a rotatable device to which said point is eccentrically connected, a holding part, a screw substantially parallel to said point passing loosely through said rotatable device and engaging said holding part, and a friction device between the screw and the rotatable device.

3. Beam compasses comprising two parts, one the marking part and the other the centering part, a beam to which said parts are clamped, the centering part provided with an engaging point, a disk to which the engaging point is eccentrically fastened said engaging point projecting from the lower face thereof, a holding device loosely passing through said disk and projecting on each side thereof, the holding device and the engaging point substantially parallel to each other and means for frictionally holding said disk in any desired position.

4. Beam compasses comprising a centering part adapted to be connected to the beam, a disk rotatably connected therewith, a frictional device for frictionally clamping said disk to the part said disk located between the frictional device and said part, a centering point eccentrically mounted upon said disk the engaging point being substantially parallel to the axis of rotation of said disk.

5. Beam compasses comprising a centering part adapted to be connected to the beam, a disk rotatably connected therewith, a frictional device for frictionally clamping said disk to the part, a centering point eccentrically mounted upon said disk, and friction reducing washers between the frictional surfaces associated with said disk.

6. Beam compasses comprising a body part, a rotatable disk connected with said part, a holding piece passing therethrough, a spring washer associated with said disk and adapted to be forced by the holding piece toward the disk so as to frictionally hold it in position but permit it to rotate, a centering point eccentrically connected with said disk.

7. Beam compasses comprising two parts, a beam to which said parts are clamped, a clamping device associated with one of said parts comprising a clamping piece, a screw mounted in said part and rotatably connected with said clamping piece so that the clamping piece is moved up or down by rotating the screw, a disk rotatably connected with said part, a spring washer associated with said disk means for bringing said spring washer into frictional engagement with the disk and an engaging point eccentrically mounted on said disk.

FRANK S. HURST.

Witnesses:
M. RAY COSTERISAN,
WM. C. POE.